United States Patent Office 3,071,554
Patented Jan. 1, 1963

3,071,554
POLYMERIC 2,4,6-THIONYLISOCYANURATE AND PROCESS OF PREPARING SAME
Francis L. Scott, Lynnewood Gardens, Elkins Park, and Raymond Netsch, North Wales, Pa., assignors to Pennsalt Chemicals Corporation, Philadelphia, Pa., a corporation of Pennsylvania
No Drawing. Filed Apr. 5, 1960, Ser. No. 19,985
3 Claims. (Cl. 260—2.5)

This invention deals with a novel polymer and with its perparation. In particular, the invention relates to a novel foam-like polymer containing carbon, nitrogen, oxygen and sulfur and which we call polymeric 2,4,6-thionylisocyanurate.

In an article published by G. S. Forbes and H. H. Anderson in the Journal of the American Chemical Society, vol. 65, page 2271 (1943) it is recorded that thionyl cyanate [SO(OCN)$_2$] (presumably prepared by reaction of a metal cyanate and thionyl chloride) is a brownish-yellow solid which is unstable in air. In working in the field of reactions between metal cyanates and sulfur oxychlorides, it has now unexpectedly been found that when a metal cyanate and thionyl chloride are reacted, a yellow oil, believed to be thionyl diisocyanate [SO(NCO)$_2$], results which on heating yields polymeric 2,4,6-thionylisocyanurate. This is particularly surprising in view of other observed reactions of related sulfur oxychlorides with metal cyanates and metal thiocyanates. For example, reaction of sulfuryl chloride (SO$_2$Cl$_2$) and silver cyanate yields cyanuric acid whereas silver isothiocyanate reacted with either thionyl chloride or sulfuryl chloride yields poly-(para)thiocyanogen [(CNS)$_x$], a brownish-yellow solid. In these reactions no materials comparable to the polymer of this invention are obtained.

The novel polymer of this invention is a red, foam-like (i.e. cellular) solid which is stable in air at room temperature and up to about 100° C. Analytical and infrared studies on its composition support the conception of its structure as

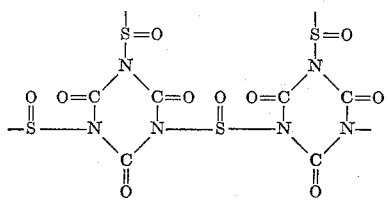

where the repeating unit is:

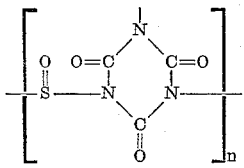

As is evident from the above structure, polymeric 2,4,6-thionylisocyanurate is a highly cross-linked polymer. The polymer effervesces when treated with water, alcohols, amines, or other active hydrogen-containing compounds and cleaves to cyanuric and sulfurous acids. However, it is stable in air and because of its foam-like character is of use as a thermal insulator.

Production of 2,4,6-thionylisocyanurate is achieved readily using techniques familiar to the chemical arts. Thionyl chloride and a metal cyanate salt are first reacted usually in stoichiometric amounts (i.e., in a molar ratio of 1:2) to form the thionyl diisocyanate. This reaction is usually carried out in an inert solvent such as ethers (e.g. dioxane, diethyl ether, tetrahydrofurane, etc.), nitriles (e.g. acetonitrile), aromatic hydrocarbons (e.g. benzene, toluene, xylene, etc.), nitroalkanes and the like. Ethers and aromatic hydrocarbon solvents are preferred; (e.g. anhydrous benzene or diethyl ether) and preferably, the thionyl chloride is added slowly to a suspension of the metal cyanate in the solvent. The reaction is exothermic, starting at room temperature and increasing in temperature several degrees as it proceeds. To ensure complete reaction, however, the reaction mass is preferably refluxed for a short time (say 0.5 to 2 hours). The metal chloride precipitate is then filtered off and the solvent removed by vacuum distillation. The thionyl diisocyanate remaining is an oily, yellow liquid. Heating this yellow material at a temperature between about 50° and about 100° C. (preferably at about 50° to 80° C.) causes it to foam vigorously and exhibit exothermic reaction. The resulting product is the red foam-like polymeric 2,4,6-thionylisocyanurate.

The metal cyanate used to react with the thionyl chloride may be any ionic metal cyanate salt. Because of availability, however, it is preferred to use the cyanate salts of those metals of groups IA, IB, IIB, and IVA. Of these, the preferred salts are silver and mercury cyanates.

The following examples will serve to more fully illustrate the invention:

*Example I*

Into a 1000 ml. 3-necked flask fitted with a sealed stirrer, addition funnel, thermowell and reflux condenser, and surrounded by a water bath was charged 75 g. (0.5 mole) of freshly prepared silver cyanate and 300 ml. of purified anhydrous ether. While the mixture was being vigorously stirred, 18.2 ml. (0.25 mole) of redistilled thionyl chloride was added dropwise. The addition was allowed to take place over a period of 80 minutes during which time the temperature of the reaction liquor rose slowly from 19°–24° C. The mixture was then refluxed for 90 minutes, after which time it was allowed to cool, and an aliquot of the ethereal solution was taken which was analyzed for its thionyl chloride content (by hydrolysis of the SOCl$_2$ to HCl) and the sample was found to contain only 1% of the original thionyl chloride.

The reaction liquor was then filtered and the ethereal filtrate was gently stripped under vacuum. The heating bath was not allowed to rise above 44° C. There remained 34 g. of a yellow semi-solid viscous mass whose spectral characteristics suggested it was impure

SO(NCO)$_2$

On heating at 80° C. this yielded a red foam-like solid.

*Example II*

Into a 2000 ml. 3-necked flask again fitted with a sealed stirrer, an addition-funnel (with a pressure equalizing arm) and a reflux condenser (which was connected in turn to a drying-tower and a Dry-Ice trap) was charged 195 g. (1.3 moles) of silver isocyanate and 250 ml. of anhydrous benzene. To this vigorously-stirred mixture at room temperature was then added dropwise 94.6 ml. (155 g., 1.3 moles) of thionyl chloride. The reaction refluxed briefly (10 minutes) during the rapid addition. It was then allowed to stand at ambient temperatures for 20 hours. The mixture was then filtered and the benzene solvent was stripped at 100 mm. When the residual liquor in the pot had become concentrated, a vigorous exothermic foaming resulted. The product was a reddish-brown porous solid (39.6 g.) which began decomposing at about 95° C. Its infrared spectrum revealed the presence of SO, and cyanurate type carbonyl absorptions.

*Analysis.*—Calcd. for C$_3$N$_3$SO$_4$: C, 20.69; N, 24.14; S, 18.40. Found: C, 21.57; N, 25.08; S, 19.66.

As indicated, the novel polymer of this invention is useful as an insulator. In addition to its use for thermal insulation, it will find utility for sound and dielectric insulation. When crushed to a fine particle size, it is useful as a cleaning abrasive, particularly for porcelain and metal surfaces from which it can be removed by flushing with water.

While the above description and examples serve to illustrate the invention, they are not to be construed as limiting same. Accordingly, various modifications and changes may be made by the skilled artisan which will fall within the spirit and scope of the invention.

We claim:
1. Homopolymeric 2,4,6-thionylisocyanurate.
2. A process for the preparation of polymeric 2,4,6-thionylisocyanurate which comprises heating thionyl diisocyanate at a temperature between about 50° C. and about 100° C.
3. A process for preparing polymeric 2,4,6-thionylisocyanurate which comprises reacting silver cyanate and thionyl chloride in an inert solvent to yield thionyl diisocyanate and heating said thionyl diisocyanate at a temperature between about 50° and about 100° C. until a solid cellular product is formed.

References Cited in the file of this patent

Dixon: Chemical Soc. Journal (London), volume LXXIX, 1901, part 1, pages 541 to 552, page 552 relied upon.

Forbes et al.: Journal American Chem. Soc., December, 1943, volume 65, pages 2271 to 2274.

Saunders et al.: Chemical Reviews, 1948, volume 43, pages 203–218.